US012020862B2

(12) United States Patent
Banba et al.

(10) Patent No.: US 12,020,862 B2
(45) Date of Patent: Jun. 25, 2024

(54) COIL ELEMENT ASSEMBLY AND COIL MODULE

(71) Applicant: Murata Manufacturing Co., Ltd., Kyoto (JP)

(72) Inventors: Shinichiro Banba, Kyoto (JP); Akihiro Muranaka, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 18/168,627

(22) Filed: Feb. 14, 2023

(65) Prior Publication Data

US 2023/0187131 A1 Jun. 15, 2023

Related U.S. Application Data

(60) Division of application No. 16/715,777, filed on Dec. 16, 2019, now Pat. No. 11,615,918, which is a (Continued)

(30) Foreign Application Priority Data

Jun. 19, 2017 (JP) ................................ 2017-119300

(51) Int. Cl.
*H01F 41/00* (2006.01)
*H01F 5/06* (2006.01)
(Continued)

(52) U.S. Cl.
CPC ............ *H01F 41/041* (2013.01); *H01F 5/06* (2013.01); *H01F 27/32* (2013.01)

(58) Field of Classification Search
CPC .. H01F 27/2847; H01F 27/303; H01F 27/306; H01F 27/32; H01F 5/06; H01F 41/041; H01F 41/122; H01F 2027/2814
See application file for complete search history.

(56) References Cited

U.S. PATENT DOCUMENTS 4,283,699 A 8/1981 Ehrgott et al.
2014/0300236 A1* 10/2014 Takizawa ................ H02K 3/38 310/198
(Continued)

FOREIGN PATENT DOCUMENTS

JP H01-302809 A 12/1989
JP 2004-335636 A 11/2004
(Continued)

OTHER PUBLICATIONS

International Search Report for International Application No. PCT/JP2018/022699 dated Aug. 28, 2018.
(Continued)

*Primary Examiner* — Paul D Kim
(74) *Attorney, Agent, or Firm* — Pearne & Gordon LLP

(57) ABSTRACT

A coil element assembly includes a plurality of coil elements each including a pair of leg portions and a bridge portion connecting first end portions of the pair of leg portions together, the coil elements being disposed to cross a predetermined winding axis, and a block comprising a resin and fixing the plurality of coil elements arranged along the winding axis. A coil module includes a coil conductor including a plurality of coil elements and a plurality of wire electrodes disposed on a circuit board, each of the plurality of coil elements including a pair of leg portions and a bridge portion connecting one end portions of the pair of leg portions together, the plurality of coil elements being disposed to cross a winding axis.

7 Claims, 3 Drawing Sheets

Related U.S. Application Data continuation of application No. PCT/JP2018/022699, filed on Jun. 14, 2018.

(51) Int. Cl.

| | |
|---|---|
| ***H01F 27/32*** | (2006.01) |
| ***H01F 41/04*** | (2006.01) |

(56) References Cited

U.S. PATENT DOCUMENTS

| | | | | |
|---|---|---|---|---|
| 2016/0254718 | A1* | 9/2016 | Watanabe .......... | H02K 15/0421<br>310/208 |
| 2018/0212496 | A1* | 7/2018 | Gohs .................... | H02K 15/024 |

FOREIGN PATENT DOCUMENTS

| | | | |
|---|---|---|---|
| JP | 2012-080699 | A | 4/2012 |
| JP | 2013-131718 | A | 7/2013 |
| JP | 2016-136785 | A | 7/2016 |
| JP | 2016-219059 | A | 12/2016 |

OTHER PUBLICATIONS

Written Opinion for International Application No. PCT/JP2018/022699 dated Aug. 28, 2018.

* cited by examiner

COIL ELEMENT ASSEMBLY AND COIL MODULE

This is a division of U.S. patent application Ser. No. 16/715,777 filed on Dec. 16, 2019, now U.S. Pat. No. 11,615,918, which is a continuation of International Application No. PCT/JP2018/022699 filed on Jun. 14, 2018, which claims priority from Japanese Patent Application No. 2017-119300 filed on Jun. 19, 2017. The contents of these applications are incorporated herein by reference in their entireties.

BACKGROUND OF THE DISCLOSURE

Field of the Disclosure

The present disclosure relates to a method for manufacturing a coil element assembly that is mounted on a circuit board to form a coil conductor, and a method for manufacturing a coil module including the coil element assembly, and a coil element assembly and a coil module manufactured by these methods.

Description of the Related Art

A coil module including a circuit board and coils as illustrated in FIG. 5 is known thus far. This coil module 100 includes a circuit board 101, an annular coil core 102 mounted on an upper surface 101*a* of the circuit board 101, and coil conductors 103, which are helically wound around the coil core 102. Each coil conductor 103 includes multiple coil pins 103*a* disposed across the coil core 102 and having a substantially letter-U shape, and multiple wire electrodes (not illustrated) on a lower surface 101*b* of the circuit board 101. Support bodies 104 are disposed at positions where the coil pins 103*a* cross the coil core 102. Each support body 104 has a recess 104*a* that allows the coil core 102 to be fitted therein and multiple through-holes 104*b* for positioning the coil pins 103*a*. The circuit board 101 has through-holes 105 into which the tips of leg portions of the coil pins 103*a* are insertable. In this coil module 100, the tip of each coil pin 103*a* is inserted into the corresponding one of the through-holes 105 to protrude from the lower surface 101*b* of the circuit board 101, and the tip of each coil pin 103*a* is bonded with solder to an end portion of the corresponding one of the wire electrodes to form the coil conductor 103 that is helically wound around the coil core 102.

PTL 1: Japanese Unexamined Patent Application Publication No. 1-302809

BRIEF SUMMARY OF THE DISCLOSURE

However, the existing coil module 100 involves forming of the through-holes 104*b* in the support bodies 104 and forming of the through-holes 105 in the circuit board 101, and thus costs for manufacturing a coil module increase. Inserting the coil pins 103*a* into the through-holes 104*b* involves many processes, including alignment of the coil pins 103*a*, and thus causes an increase of the manufacturing costs.

The through-holes 104*b* are generally formed by laser processing or drilling. To form separate through-holes 104*b*, the through-holes 104*b* adjacent to each other need to be spaced at a pitch of a predetermined size or larger. This structure prevents the arrangement of the coil pins 103*a* at a narrower pitch or the size reduction of the coil module 100. To stably insert the coil pins 103*a* into the through-holes 104*b*, the through-holes 104*b* need to have a larger diameter than the coil pin 103*a*, that is, the through-holes 104*b* need to have play. This play may degrade the positioning accuracy of the coil pins 103*a*, such as tilting of the coil pins 103*a*, and degrade the coil characteristics such as frequency characteristics. The degradation of the positioning accuracy of the coil pins 103*a* may reduce the yield when the coil pins 103*a* are mounted on the circuit board 101 with solder.

The present disclosure has been made to address the above problem, and aims to provide a coil element assembly and a coil module that are inexpensive and have preferable characteristics, and a method for manufacturing the same.

To achieve the above, the present disclosure provides a method for manufacturing a coil element assembly that includes a coil conductor including a plurality of coil elements, each of the coil elements including a pair of leg portions and a bridge portion connecting end portions of the pair of leg portions together. The method includes an assembly forming step of forming the coil element assembly by integrating the plurality of coil elements together with resin. In the assembly forming step, the coil element assembly is formed by introducing resin into a die set, in which the plurality of coil elements are arranged, to form a block.

In this structure, an assembly (coil element assembly) of coil elements constituting a part of a coil conductor is formed by introducing resin into a die set, in which multiple coil elements are arranged, to form a block. Unlike an existing structure, this structure does not involve forming of through-holes in the block to arrange and fix the coil elements, so that the coil element assembly can be manufactured at low costs. In addition, the block having no through-holes allows the coil elements to be arranged at a narrower pitch. In addition, this structure does not degrade the positioning accuracy due to the play of the through-holes, such as tilting of the coil elements. The coil elements that do not tilt improve the mount yield of the coil element assembly.

To achieve the above, the present disclosure provides a method for manufacturing a coil module that includes a coil conductor including a plurality of coil elements and a plurality of wire electrodes formed on a circuit board, each of the coil elements including a pair of leg portions and a bridge portion connecting end portions of the pair of leg portions together. The method includes an assembly forming step of forming the coil element assembly by integrating the plurality of coil elements together with resin, and a conductor forming step of mounting the coil element assembly on the circuit board to complete the coil conductor wound about a predetermined winding axis. In the assembly forming step, the coil element assembly is formed by introducing resin into a die set, in which the plurality of coil elements are arranged, to form a block.

This structure does not involve forming of through-holes in the block to arrange and fix the coil elements, so that the coil module can be manufactured at low costs. In addition, this structure does not degrade the positioning accuracy due to the play of the through-holes, such as tilting of the coil elements. Thus, a coil module having preferable coil characteristics can be manufactured.

To achieve the above, the present disclosure provides a coil element assembly that includes a plurality of coil elements each including a pair of leg portions and a bridge portion connecting first end portions of the pair of leg portions together, the coil elements being disposed to cross a predetermined winding axis, and a block made of resin and fixing the plurality of coil elements arranged along the winding axis. The resin of the block is disposed between the pairs of leg portions of the plurality of coil elements. Second end portions of the pair of leg portions of each of the plurality of coil elements are connected to predetermined wire electrodes disposed on a circuit board to form a coil conductor that is wound about the predetermined winding axis.

In this structure, multiple coil elements constituting a part of a coil conductor is fixed in the block, and thus are prevented from being short-circuited with each other. Resin is filled in a space between both leg portions and the bridge portion of the block, and thus the coil element assembly can enhance its strength.

Part of the pair of leg portions of each of the plurality of coil elements may be exposed through the block.

In this structure, the arrangement of coil elements in a coil element assembly can be easily inspected.

The pair of leg portions of each of the plurality of coil elements may have the second end portions bent in a direction parallel to the main surface of the circuit board.

In this structure, a connection area between the coil elements and the circuit board can be easily increased to mount the coil element assembly on the circuit board. Thus, the element assembly can enhance its connection reliability, and the coil element assembly can improve its mount yield.

To achieve the above, the present disclosure provides a coil module that includes a circuit board and a coil conductor wound about a predetermined winding axis. The coil conductor includes a plurality of coil elements, each of which includes a pair of leg portions and a bridge portion that connects end portions of the pair of leg portions, the plurality of coil elements being disposed to cross the predetermined winding axis, and a plurality of wire electrodes disposed on the circuit board. The plurality of coil elements are fixed with a resin-made block while being arranged along the winding axis to form a coil element assembly. Resin of the block is disposed between the pair of leg portions of each of the plurality of coil elements.

In this structure, multiple coil elements constituting a part of the coil conductor are fixed in the block, and thus can be prevented from being short-circuited with each other. Thus, a coil module having high coil characteristics can be provided.

According to the present disclosure, to form a coil element assembly constituting a part of a coil conductor, resin is introduced in a die set, in which multiple coil elements are arranged, to form a block. This procedure does not involve forming of through-holes in a block to allow the coil elements to be arranged or fixed thereto, unlike in the existing procedure. Thus, the coil module can be manufactured at low costs. In addition, the block having no through-holes allows the coil elements to be arranged at a narrower pitch. In addition, this procedure does not degrade the positioning accuracy due to the play of the through-holes, such as tilting of the coil elements. Thus, a coil module having preferable coil characteristics can be manufactured. The coil elements that do not tilt improve the mount yield of the coil element assembly.

Figure 1:
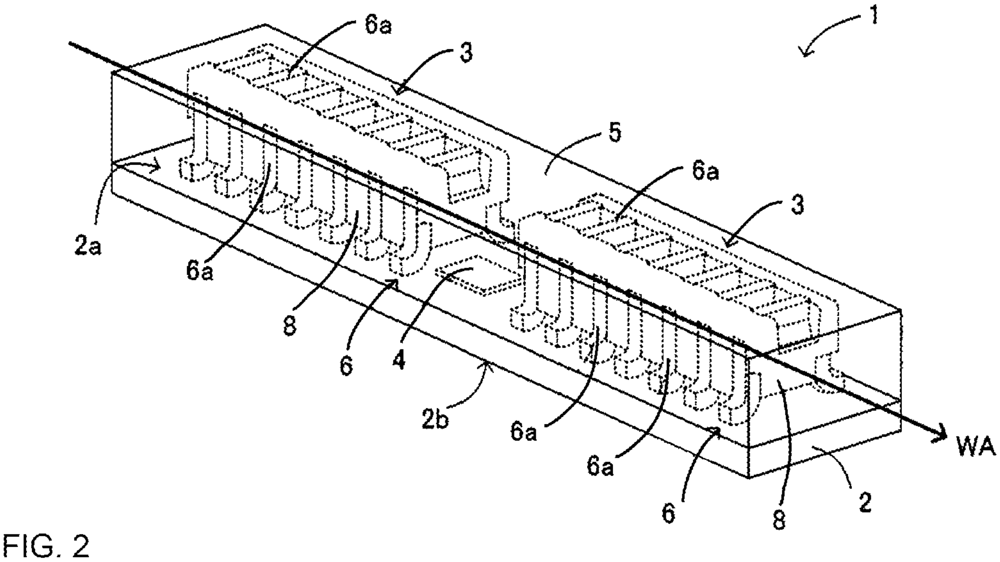
FIG. 1 illustrates a coil module according to an embodiment of the present disclosure.
Figure 4A:
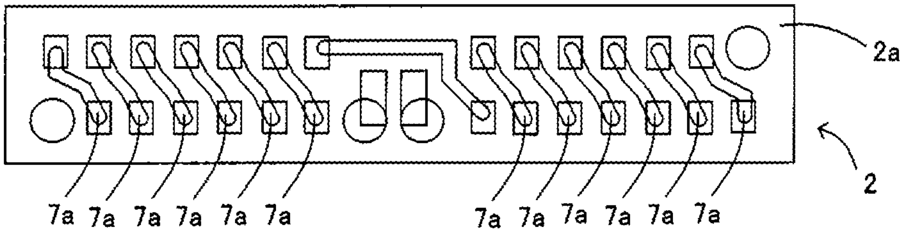
Figure 4B:
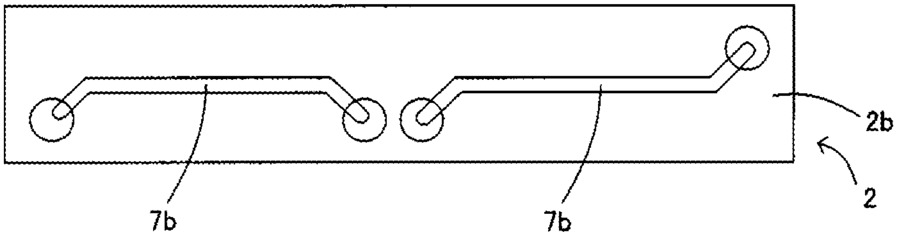

Each of FIGS. 4A and 4B illustrates a layout of a wire electrode of FIG. 1.

Figure 5:
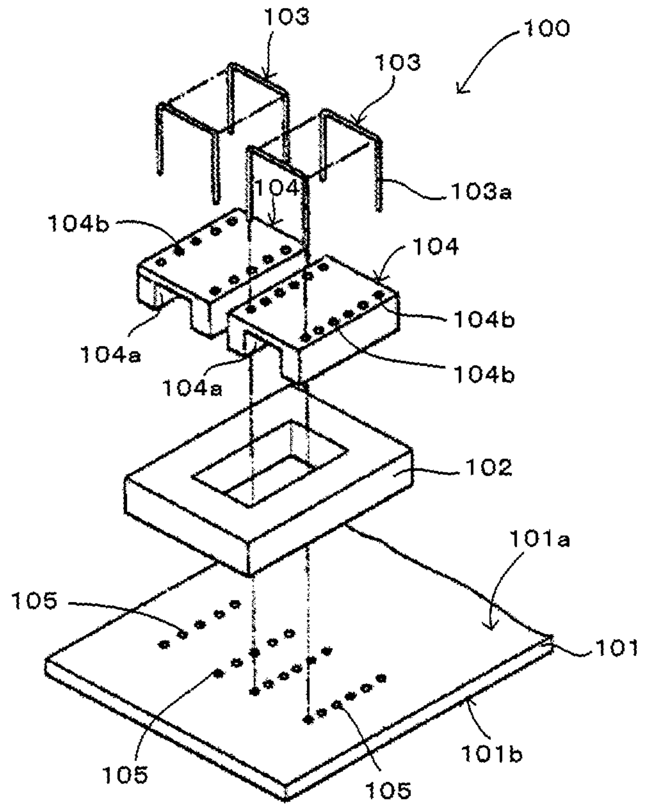

FIG. 5 is an exploded perspective view of an existing coil module.

DETAILED DESCRIPTION OF THE DISCLOSURE

Figure 2:
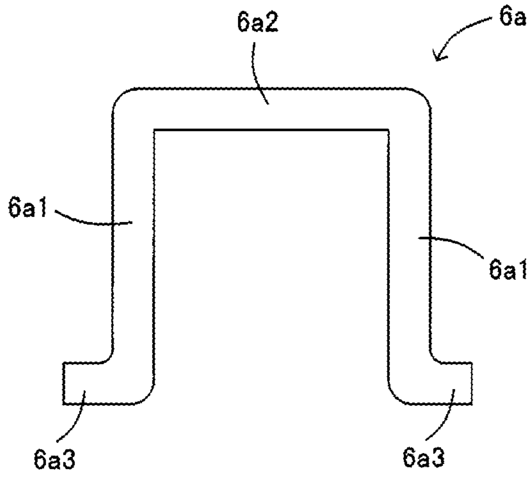
FIG. 2 is a cross-sectional view of a coil element of FIG. 1.
Figure 3:
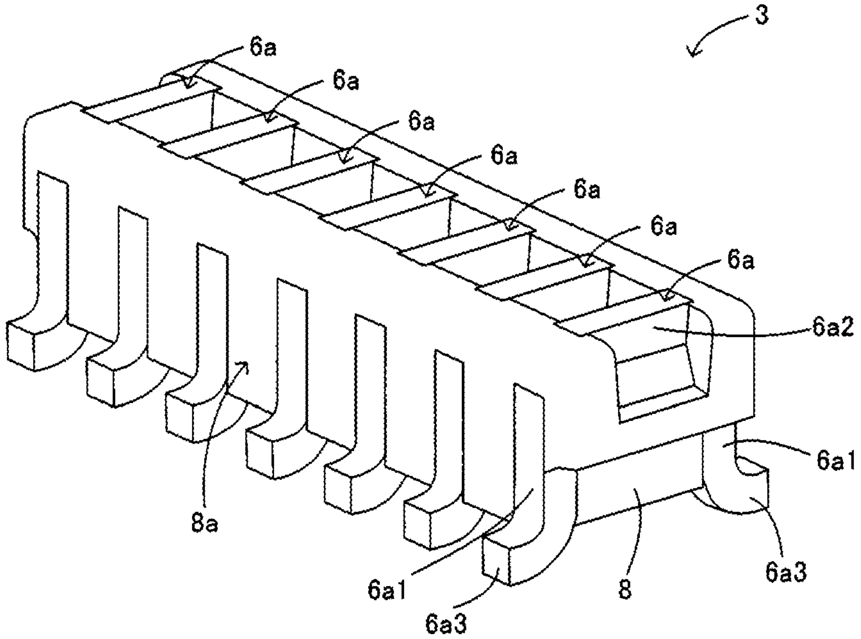
FIG. 3 is a perspective view of a coil element assembly of FIG. 1.

A coil module 1 according to an embodiment of the present disclosure will be described with reference to FIG. 1 to FIGS. 4A and 4B. FIG. 1 is a perspective view of a coil module 1, FIG. 2 is a cross-sectional view of a coil element, FIG. 3 is a perspective view of a coil element assembly, and FIGS. 4A and 4B illustrate layouts of wire electrodes on the top surface and the back surface of a circuit board.

As illustrated in FIG. 1, a coil module 1 according to the present embodiment includes a circuit board 2, multiple coil element assemblies 3 and a component 4 mounted on an upper surface 2*a* of the circuit board 2, and a sealing resin layer 5 that seals the coil element assembly 3 and the component 4. Together with multiple coil elements 6*a* and multiple wire electrodes 7*a* (refer to FIG. 4A) disposed on the upper surface 2*a* of the circuit board 2, the coil module 1 according to the present embodiment forms a coil conductor 6 that is wound about a winding axis WA. This coil conductor 6 functions as an antenna and is used as an antenna module for radio-frequency identification (RFID).

The circuit board 2 is formed from, for example, a glass epoxy substrate or a ceramic substrate (for example, low temperature co-fired ceramic substrate, or LTCC substrate), and multiple wire electrodes 7*a* and 7*b* are laid out as illustrated in FIGS. 4A and 4B on an upper surface 2*a* and a lower surface 2*b* of the circuit board 2. The wire electrodes 7*a* and 7*b* are made of a material typically used for wire electrodes, such as Cu, Al, or Au.

The component 4 is formed from a semiconductor device made of a semiconductor such as Si or GaAs, or a chip component such as a chip inductor, a chip capacitor, or a chip resistor. The component 4 is mounted on the circuit board 2 by a typical surface mount technology such as soldering.

The coil conductor 6 includes multiple wire electrodes 7*a* disposed on the upper surface 2*a* of the circuit board 2, and the multiple coil elements 6*a*, constituting a part of the coil element assembly 3. Specifically, when the coil element assemblies 3 are mounted on the upper surface 2*a* of the circuit board 2, the wire electrodes 7*a* and substrate connection portions 6*a*3 (described later) of the respective coil elements 6*a* are connected together to form the coil conductor 6 that is helically wound about the winding axis WA. In the coil element assembly 3, the multiple coil elements 6*a* are integrated together with a resin-made block 8.

The coil elements 6*a* have the same shape. Specifically, as illustrated in FIG. 2, each coil element 6*a* has a pair of leg portions 6*a*1, disposed substantially parallel to each other, and a bridge portion 6*a*2, which connects first end portions of both leg portions 6*a*1, and substrate connection portions 6*a*3, formed by bending the tips of second end portions of both leg portions 6*a*1 substantially 90°.

The block 8 functions as a medium for fixing the coil elements 6*a* into an array. As illustrated in FIG. 3, a portion of the block 8 surrounded by both leg portions 6*a*1 and the bridge portion 6*a*2 of each coil element 6*a* is formed by being filled with resin. Specifically, the block 8 has no recess for accommodating the coil core, and has a portion surrounded by both leg portions 6*a*1 and the bridge portion 6*a*2 filled with resin. Both leg portions 6*a*1 of each coil element 6*a* are exposed from side surfaces 8*a* of the block 8 (refer to FIG. 3). The block 8 can be formed by, for example, thermoplastic resin such as a liquid crystal polymer, or thermosetting resin.

The coil elements 6*a* are fixed to the block 8 with both leg portions 6*a*1 and the bridge portion 6*a*2 disposed at such positions as to cross the winding axis WA. Specifically, in the state where the coil element assemblies 3 are mounted on the circuit board 2, the coil elements 6*a* are arranged in the direction parallel to the winding axis WA and fixed while each having one of the leg portions 6*a*1 disposed on one side of the winding axis WA of the coil conductor 6 and the other leg portion 6*a*1 disposed on the other side of the winding axis WA (refer to FIG. 1 and FIG. 3). The substrate connection portions 6*a*3 of the coil elements 6*a* are left without being covered with the block 8, and serve as connection portions when the coil element assemblies 3 are mounted on the circuit board 2.

Each wire electrode 7*a* disposed on the upper surface 2*a* of the circuit board 2 is paired with the corresponding one of the coil elements 6*a*. Each wire electrode 7*a* connects the substrate connection portion 6*a*3 connected to a first one of the leg portions 6*a*1 of the paired coil element 6*a*, and the substrate connection portion 6*a*3 connected to a second one of the leg portions 6*a*1 of a coil element 6*a* adjacent to the paired coil element 6*a*. This connection structure between the coil elements 6*a* and the wire electrodes 7*a* forms a coil conductor 6 that is wound about the winding axis WA.

The sealing resin layer 5 seals the coil element assemblies 3 and the component 4, and is stacked on the upper surface 2*a* of the circuit board 2. The sealing resin layer 5 is made of general sealing resin such as epoxy resin.

(Method for Manufacturing Coil Module)

A method for manufacturing a coil module 1 will be described below. Each coil element 6*a* is formed by subjecting one metal plate (such as a Cu plate) to a cutting process and a bending process. Specifically, one metal plate is cut into a shape where the coil elements 6*a* (before being bent) are arranged equidistantly and parallel to each other.

Then, each coil element 6*a* subjecting to the cutting process is bent to form the pair of leg portions 6*a*1, the bridge portion 6*a*2, and the substrate connection portions 6*a*3.

Subsequently, while the coil elements 6*a* subjected to the bending process are arranged in a die set having the shape corresponding to the shape of the block 8, resin is introduced into the die set to form the block 8, and to thus form the coil element assembly 3. At this time, a part of the leg portions 6*a*1, a part of the bridge portion 6*a*2, and the substrate connection portions 6*a*3 of each coil element 6*a* are exposed without being covered with the block 8 (refer to FIG. 3). Resin is filled in a space surrounded by the leg portions 6*a*1 and the bridge portions 6*a*2 to form the block 8.

Subsequently, the coil element assemblies 3 are mounted on the upper surface 2*a* of the circuit board 2 to complete the coil module 1. At this time, the substrate connection portions 6*a*3 of each coil element 6*a* are connected with solder to the end portions of the corresponding wire electrodes 7*a* to form the coil conductor 6 helically wound about the winding axis WA. The circuit board 2 can be formed by a general method for forming a circuit board. The procedure of mounting the coil element assemblies 3 and the component 4 on the circuit board 2 may be performed in any order; the coil element assembly 3 may be mounted after the component 4 is mounted, or the component 4 may be mounted after the coil element assemblies 3 are mounted.

Thus, in the above embodiment, to form an assembly (coil element assembly 3) of the coil elements 6*a* constituting a part of the coil conductor 6, resin is introduced into the die set, in which the multiple coil elements 6*a* are arranged, to form the block 8. This procedure can omit forming of through-holes in the block to allow the coil elements to be arranged or fixed thereto, unlike in the existing procedure, and thus the coil module 1 can be manufactured at lower costs. In a structure where the support body 104 has the through-holes 104*b*, as in the existing coil module 100 (refer to FIG. 5), the through-holes 104*b* need to be spaced apart at a predetermined distance or longer to prevent adjacent through-holes 104*b* from connecting to each other. Thus, the pitch between the through-holes 104*b* cannot be narrowed beyond a certain limit. In the coil module 1 according to the present embodiment, on the other hand, the coil elements 6*a* can be arranged at a narrower pitch since the block 8 (corresponding to "the support body 104" in an existing technology) has no through-holes. In addition, unlike the existing coil module 100 (refer to FIG. 5), the coil module 1 according to the present embodiment does not degrade the positioning accuracy due to the play of the through-holes 104*b*, such as tilting of the coil elements 6*a*. Thus, the coil module 1 having preferable coil characteristics can be manufactured. The coil elements 6*a* that stand without being tilted improve the mount yield of the coil element assembly 3.

Each of the coil elements 6*a* has the substrate connection portions 6*a*3 formed by bending the tips of the second end portions of both leg portions 6*a*1 by 90°. Compared to a structure where the coil elements 6*a* are connected to the circuit board 2 without having the tips of the second end portions of both leg portions 6*a*1 bent, the contact area between themselves and the circuit board 2 increases. This structure can thus improve the reliability in connection between the coil element assembly 3 and the circuit board 2, and improve the mount yield of the coil element assembly 3.

The present disclosure is not limited to the above-described embodiments, and can be changed in various different manners other than the above without departing from the gist of the disclosure.

For example, each coil element 6*a* may have any shape, such as a letter-U shape, that can form a helical coil conductor.

The present disclosure is widely applicable to various types of coil modules including a coil conductor partially formed from a wire electrode of a circuit board.

1 coil module
2 circuit board
3 coil element assembly
4 component
6 coil conductor
6*a* coil element
6*a*1 leg portion
6*a*2 bridge portion
7*a*, 7*b* wire electrode
8 block

The invention claimed is:

1. A coil element assembly, comprising:
a plurality of coil elements each including a pair of leg portions and a bridge portion connecting first end portions of the pair of leg portions together, the coil elements being disposed to cross a predetermined winding axis; and
a block comprising a resin and fixing the plurality of coil elements arranged along the winding axis, wherein the resin of the block is disposed between the pairs of leg portions of the plurality of coil elements, wherein second end portions of the pair of leg portions of each of the plurality of coil elements are connected to predetermined wire electrodes disposed on a circuit board to form a coil conductor wound about the predetermined winding axis, and wherein a part of the bridge portion is covered with the block, and a remaining part of the bridge portion is exposed without being covered with the block.

2. The coil element assembly according to claim 1, wherein a part of the pair of leg portions of each of the plurality of coil elements is exposed through the block.

3. The coil element assembly according to claim 2, wherein the second end portions of the pair of leg portions of each of the plurality of coil elements are bent in a direction parallel to the bridge portion.

4. The coil element assembly according to claim 1, wherein the second end portions of the pair of leg portions of each of the plurality of coil elements are bent in a direction parallel to the bridge portion.

5. The coil element assembly according to claim 1, wherein an entire space surrounded by the pair of leg portions and the bridge portion except for the second end portions is filled with the resin of the block.

6. A coil module, comprising:

a circuit board; and a coil conductor wound about a predetermined winding axis, wherein the coil conductor includes a plurality of coil elements each of which includes a pair of leg portions and a bridge portion connecting end portions of the pair of leg portions together, the plurality of coil elements being disposed to cross the predetermined winding axis, and a plurality of wire electrodes disposed on the circuit board, wherein the plurality of coil elements are fixed with a block comprising a resin while being arranged along the winding axis to form the coil element assembly according to claim 1, wherein the resin of the block is disposed between the pair of leg portions of each of the plurality of coil elements, and wherein a part of the bridge portion is covered with the block, and a remaining part of the bridge portion is exposed without being covered with the block.

7. The coil module according to claim 6, wherein an entire space surrounded by the pair of leg portions and the bridge portion except for the second end portions is filled with the resin of the block.

* * * * *